(12) United States Patent
Miller

(10) Patent No.: US 6,698,928 B2
(45) Date of Patent: Mar. 2, 2004

(54) FLEXIBLE PACKAGES HAVING REUSABLE PULL-TAB OPENERS

(75) Inventor: Anne Louise Miller, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/032,297

(22) Filed: Dec. 21, 2001

(65) Prior Publication Data

US 2003/0118255 A1 Jun. 26, 2003

(51) Int. Cl.[7] .............................................. B65D 33/00
(52) U.S. Cl. .................. 383/205; 383/66; 383/203; 383/208; 229/87.05
(58) Field of Search ................ 383/205, 203, 383/207, 208, 66; 229/87.05

(56) References Cited

U.S. PATENT DOCUMENTS

| | | | |
|---|---|---|---|
| 2,402,093 A | | 6/1946 | Schermuly et al. |
| 2,684,807 A | | 7/1954 | Gerrish |
| 3,567,108 A | * | 3/1971 | Corridon ............... 229/117.23 |
| 3,784,088 A | | 1/1974 | Shea et al. |
| 3,968,926 A | | 7/1976 | Smolderen et al. |
| 4,301,848 A | | 11/1981 | Beaven et al. |
| 4,470,511 A | | 9/1984 | Meeker et al. |
| 4,492,308 A | | 1/1985 | Meeker et al. |
| 4,539,705 A | | 9/1985 | Baines |
| 4,550,439 A | | 10/1985 | Peppiatt et al. |
| 4,651,874 A | * | 3/1987 | Nakamura ................... 206/205 |
| 4,679,693 A | * | 7/1987 | Forman ....................... 383/203 |
| 4,789,067 A | * | 12/1988 | Silano ......................... 229/249 |
| 4,811,848 A | * | 3/1989 | Jud ............................. 383/205 |
| 4,822,179 A | | 4/1989 | Nattrass |
| 4,890,934 A | | 1/1990 | Feaver et al. |
| 4,934,535 A | | 6/1990 | Muckenfuhs et al. |
| 4,966,286 A | | 10/1990 | Muckenfuhs |
| 5,018,625 A | * | 5/1991 | Focke et al. .............. 229/87.05 |
| 5,040,685 A | * | 8/1991 | Focke et al. .............. 229/87.05 |
| 5,050,742 A | | 9/1991 | Muckenfuhs |
| 5,054,619 A | | 10/1991 | Muckenfuhs |
| 5,150,561 A | | 9/1992 | Muckenfuhs |
| 5,219,229 A | | 6/1993 | Sengewald |
| 5,282,687 A | | 2/1994 | Yee |
| 5,361,905 A | | 11/1994 | McQueeny et al. |
| 5,377,837 A | | 1/1995 | Roussel |
| 5,378,066 A | * | 1/1995 | Wade .......................... 383/205 |
| 5,524,759 A | | 6/1996 | Herzberg et al. |
| 5,655,843 A | | 8/1997 | Conrad et al. |
| 5,722,773 A | | 3/1998 | Conrad |
| 5,934,470 A | | 8/1999 | Bauer et al. |
| 5,967,665 A | | 10/1999 | MacDonald et al. |
| 6,004,033 A | | 12/1999 | Cirone |
| 6,113,271 A | * | 9/2000 | Scott et al. ................. 383/211 |
| 6,309,105 B1 | * | 10/2001 | Palumbo ...................... 383/211 |

FOREIGN PATENT DOCUMENTS

| | | |
|---|---|---|
| EP | 0349050 | 1/1990 |
| WO | 0349050 | 1/1990 |
| WO | 0585653 | 3/1994 |
| WO | 95/08491 | 3/1995 |

* cited by examiner

Primary Examiner—Jes F. Pascua
(74) Attorney, Agent, or Firm—Schwegman, Lundberg, Woessner & Kluth, P.A.

(57) ABSTRACT

The present invention provides a package comprising a bag having lines of weakness and a pull-tab opener secured to the bag proximate to the lines of weakness, the pull-tab opener having a pull-tab opening integral therewith. In a preferred embodiment, the pull-tab opener is a reusable pull-tab opener.

20 Claims, 11 Drawing Sheets

FLEXIBLE PACKAGES HAVING REUSABLE PULL-TAB OPENERS

BACKGROUND

Compressible personal care articles, such as incontinence garments, disposable diapers, feminine hygiene products, and so forth, are in widespread use worldwide. These items are typically sold in multiple quantities and are contained in bags or packaging composed of flexible polymer materials.

However, such packaging can be quite difficult to open. As a result, perforations are often added as an opening aid. Typical perforated opening features require a consumer to search the bag for opening instructions. Once the feature is located, the consumer must then push one or more fingers through the plastic film to initiate the opening. In many instances, a tool, such as a knife or scissors, is required to separate the perforations. Other features require the consumer to grasp or pinch a portion of the bag to separate the perforation and initiate the opening. However, it is widely recognized that such grasping or pinching is quite difficult for consumers who have limited or reduced hand strength and dexterity due to age, physical illness or fatigue.

Yet another problem with this type of packaging is the inability to reseal a package once it has been opened. This can lead to the contents spilling out during storage and/or transport.

For the reasons stated above, and for other reasons stated below which will become apparent to those skilled in the art upon reading and understanding the present specification, there is a need in the art for packaging that is easier to open and reseal.

SUMMARY

The present invention provides a package comprising a bag having lines of weakness and a reusable pull-tab opener secured to the bag proximate to the lines of weakness, the pull-tab opener having a pull-tab opening integral therewith. In one embodiment, the lines of weakness are perforations that are substantially parallel and concealed by the pull-tab opener. In this embodiment, a slit or third perforation line is substantially perpendicular to the perforations and connects the substantially parallel perforation lines at one end. In another embodiment, the perforations comprise one or more lines that angle towards each other, but do not necessarily meet. In other embodiments, the perforations form a substantially V-shape or U-shape. In these embodiments, the pull-tab can alternately be located at an area of minimum distance apart, a perforation junction, or area of maximum bend of a curve, depending on the perforation configuration.

The pull-tab opener (hereinafter "pull-tab") and bag are made from any type of flexible material, such as a polymeric plastic film, paper or paper composites and the like. As such, the bag is understood to not only include conventional bags, but also other types of flexible products, such as mailing envelopes, and so forth. The pull-tab can further function as a label having opening instructions to assist a consumer in locating and operating the opening feature. In some embodiments, the pull-tab may be a paper or paper-based material. The package may be a preformed bag or a bag formed together with the pull-tab. The products inside the package may or may not be folded and/or individually wrapped. Such products include, but are not limited to, disposable diapers, incontinence products, feminine hygiene products, or any other type of consumer product packagable in flexible bags, including, but not limited to, cat litter, food products, including pet food products, further including other types of consumer products, such as office supplies, books, magazines, household products, and so forth.

In a preferred embodiment, the present invention further provides a package comprising a bag having a flap section defined by lines of weakness in the bag; and a pull-tab secured to and extending beyond the flap section, wherein the pull-tab is designed to be used to open and reseal the bag.

The present invention also includes a method of using a pull-tab comprising hooking a pull-tab opening located on a pull-tab, the pull-tab secured to a bag having perforations; and with the pull-tab opening, pulling the pull-tab away from the bag to create a bag opening. The method further comprises accessing one or more articles through the bag opening; and closing the bag opening with the pull-tab, the pull-tab having reusable adhesive. The method can further comprise hooking the pull-tab opening again to expose the bag opening.

The present invention further includes a kit containing any embodiment of the present invention together with a plurality of articles and instructions for opening the bag and using the articles.

The design and location of the specially-designed pull-tab provides an easy-to-use opening aid in conjunction with the lines of weakness, for ease in opening the package. By arranging the pull-tab and perforations in this manner, a consumer now need only gently tug on a conveniently located pull-tab opening in order to cause the perforations to tear apart. The novel design of the lines of weakness and pull-tab combination provides an advantage over conventional methods of opening bags by eliminating the need to use a significant pinching or grasping force to open. The pull-tab opening in the pull-tab also provides an advantage over pull-tabs without any type of opening that are not only hard to locate, but can be difficult to hang onto while opening the package.

DETAILED DESCRIPTION

Figure 1:
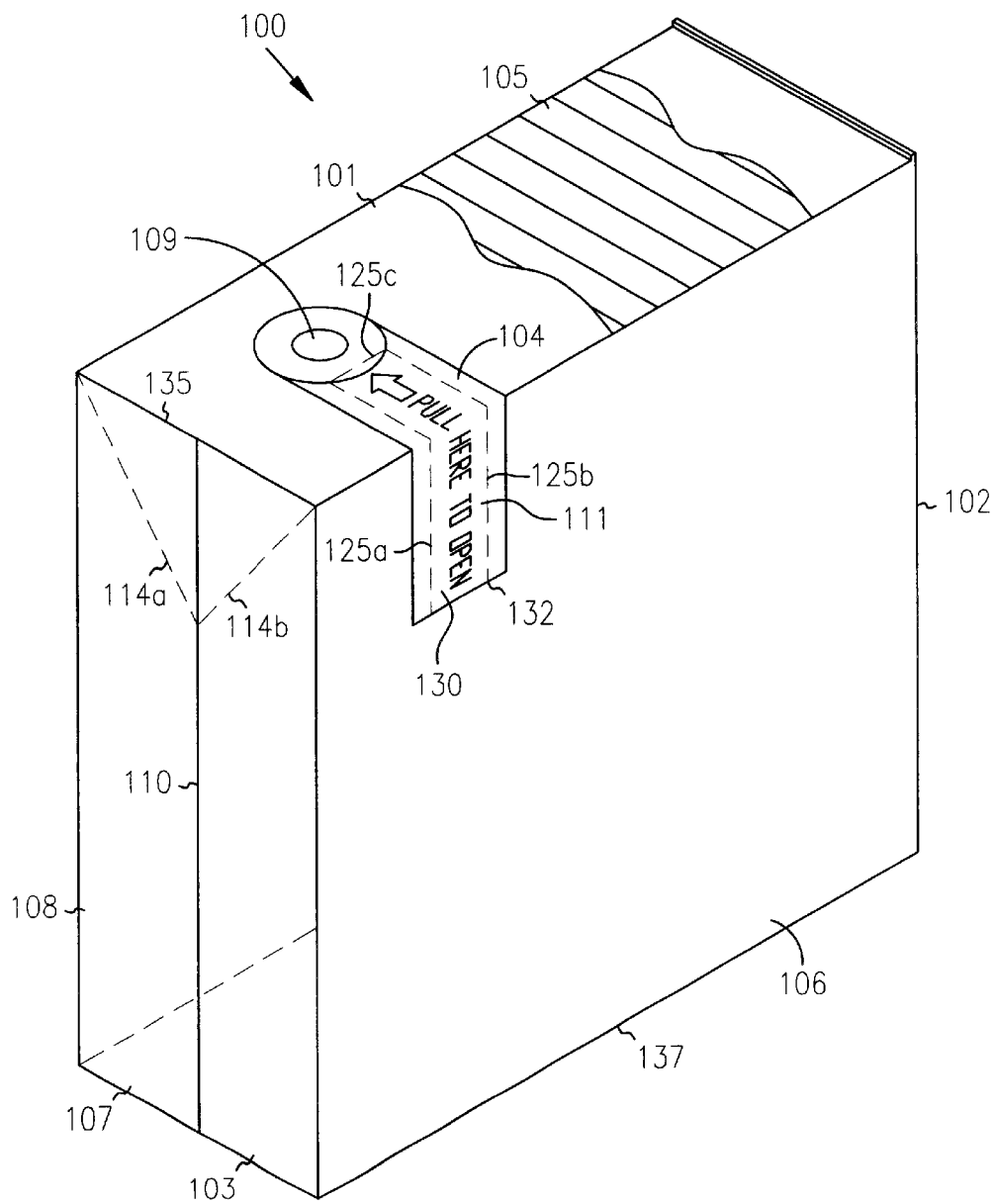
FIG. 1 is a simplified perspective view of a package comprising a bag having perforations and a reusable pull-tab located on top of the perforations in one embodiment of the present invention.

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that mechanical, procedural, and other changes may be made without departing from the spirit and scope of the present inventions. The following detailed description is, therefore, not to be taken in a limiting sense, and the scope of the present invention is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the invention.

The term "pull-tab" or "pull-tab opener" as used herein, refers to a separate piece of material attached or partially attached to a package that can be pulled on to expose or create an opening in the package. The portion of the "pull-tab" that is pulled on is referred to herein as a "pull-tab opening" which can be of any suitable size and shape. In one embodiment, the "pull-tab opening" is a hand-sized opening, which is large enough to accommodate all the fingers of even the largest hand. In a preferred embodiment, the pull-tab opening is a "finger-sized opening," which is understood to be at least large enough for one finger of a small or young individual (or an object about the size of one finger) to pass through, but not so large as to encourage a consumer to place more than three fingers through (or an object about the size of three fingers), although this may occur with consumers having relatively small fingers as compared with an average-sized consumer. As such, the pull-tab opening can assume any reasonable shape, size and geometry depending on the particular application.

The term "line of weakness" as used herein, refers to any region or area of weakened material, preferably having a length, but not necessarily a defined width. A "line of weakness" can include linear and non-linear patterns, such as curvilinear patterns of weakness, or other shapes, such as circles, rectangles, and so forth. A line of weakness includes a perforation or other series of cuts, a thinning or breakage or separation of material, or a strip of a different kind of material bridging between adjacent portion of material, that is more easily torn or broken than the adjacent portions, and which allows the user or manufacturer to separate the adjacent portions along the line of weakness. A line of weakness can further include a single extended slit or cut.

A flexible package having a pull-tab is described herein. As shown in FIG. 1, the flexible package 100 is comprised of a bag 102 and a pull-tab 104. In this embodiment, the pull-tab opener, i.e., pull-tab 104 is a strip of material covering a portion of two adjacent panels. The pull-tab 104 is positioned over and operates in conjunction with perforations 125a, 125b and 125c cut into the bag 102. A pull-tab opening 109 is contiguous with the pull-tab 104 as shown. The pull-tab 104 can optionally function as a label and contain instructions and/or information 111, such as instructions designed to help a user find the pull-tab opening 109. In FIG. 1, the instructions include an arrow pointing towards the pull-tab opening 109 together with the words, "PULL HERE TO OPEN," although the invention is not so limited. Any suitable markings and/or wording can be used to convey the opening and/or other instructions. In other embodiments, all instructions/information 111 are located on the package 102 instead of or in addition to the pull-tab 104.

The bag 102 further includes a back panel 108 as shown. The front panel 106 and back panel 108 are juxtaposed and joined together along their side edges by welds or side seams 110. When the bag 102 is filled with articles 105, the bag 102 expands and side sections 103 and 107 are created in the front and back panels, 106 and 108, respectively. Each side section 103 and 107 is about one-half the width of the articles 105. The bag 102 further has a top edge 135 and a bottom edge 137 as shown.

At one end (hereafter referred to as the "top end") of the bag 102, i.e., nearest the top panel 101, there is a top gusset formed from folds 114a and 114b that is integral in one piece with panels 106 and 108. The bag 102 is also expandable near the end opposite the top end, i.e., near the bottom end, through use of bottom side gussets (not shown) located on panels 106 and 108. As shown in FIG. 1, the gusset is typically a triangular-shaped reinforcement, with the outer folds 114a and 114b forming a triangle shape with the top edge 135. The size of the gusset varies, depending on the size and number of articles 105 being packaged, as the gusset is designed to expand or unfold sufficiently to accommodate the articles 105 within. In one embodiment, the gusset is sealed only along the side seam 110, and not along its outer folds 114a and 114b. In another embodiment, such as for larger packages 100, the gusset is also sealed to the bag 102 diagonally along the outer folds 114a and 114b which is referred to in the art as a "chevron" or reinforced seal.

The dimensions of the bag 102 vary, depending on the type and number of articles 105 being packaged. Generally, the bag 102 has a rectangular structure, although the invention is not so limited. In one embodiment, the bag 102 is about 24 cm in height (i.e., length), 30 cm in width, and when filled with articles 105, about 12 cm in depth. Although not shown in the figures herein, the corners of the packages, such as the corner defining the transition from the side section 103 to the front panel 106, are slightly curved. Other conventional construction features of the bag 102 are understood by those skilled in the art and will not be discussed in detail herein. Essentially any type of flexible bag known in the art can be used, and further information on material choices is given below.

As noted above, the perforations and pull-tab are located on two adjacent panels. In other embodiments, the perforations and/or pull-tabs are located on only one panel of the bag 102 (See, for example, FIG. 4). (In yet other embodiments described in FIGS. 8–11, the perforations are located on two adjacent panels, but the pull-tab is secured to only one of the panels). In the embodiment shown in FIG. 1, the pull-tab 104 is oriented substantially vertically along the front panel 106 and substantially horizontally along the top panel 101. In this embodiment, the lines of weakness comprise two substantially parallel lines of perforations 125a and 125b located beneath the pull-tab 104, with an additional perforation 125c, running cross-wise to connect the perforation lines 125a and 125b at the end proximate to the pull-tab opening 109. As will become apparent from the description herein, the precise location and orientation of the pull-tab 104, including the pull-tab opening 109, are not important, as long as it is located appropriately to provide the means to separate the perforations so that a user can successfully open the bag 102 and access the contents within. In a preferred embodiment, the pull-tab 104 is a reusable pull-tab having reusable securing means on at least a portion to allow the pull-tab 104 to be used repeatedly to open and reseal the package 100.

The bag 102 and pull-tab 104 can be made from any one of a wide variety of materials that are known in the art to be sufficiently flexible to accommodate the desired number of articles 105. This includes, but is not limited to, polymeric plastic, foils, paper, paper composites, and the like, or a combination thereof. In one embodiment the material is selected from the group consisting of polyethylene, polypropylene, polyester, nylon, and any combination thereof.

With regard to the bag 102, the material should have sufficient strength to hold and contain the articles 105 within without breaking and without excessive bulging or stretching of the film material. Such materials include polyethylene, polypropylene, polyester, nylon, and the like, as well as any combination thereof. In one embodiment, the material is a low density polyethylene (LDPE) film. In another embodiment, the material is a LDPE/LLDPE (linear low density polyethylene) film laminate. In yet another embodiment, the material is a LDPE/MDPE (medium density polyethylene) film laminate, a LDPE/HDPE (high density polyethylene) film laminate or the like. In another embodiment a polyethylene/polypropylene combination is used. In a specific embodiment, the material is a polyethylene film or film laminate having a thickness of about between about one (1) and four (4) mils (about 0.025 to 0.1 mm).

The pull-tab 104 can also be made from any of the aforementioned materials, but needs to be of sufficient strength to withstand the pulling forces experienced, particularly during the initial opening. Furthermore, polyethylene is known to have elastic-like properties and in one embodiment is combined with a polyester or polypropylene material to reduce the amount of elongation. Although some stretching may still occur during use of such a blended material, preferably the stretching is minimal so as not to affect the ability of the user to open and reseal the package. In most embodiments, elongation during use will not exceed about 10%. The use of nylon provides a slightly stiffer pull-tab, which is particularly useful when the pull-tab opening 109 is relatively small, such as a finger-sized opening. In one embodiment, the pull-tab 104 is a laminate material, coated with a stiffener or varnish to enhance its ability to withstand stretching. In another embodiment, the pull-tab is a paper-based product. In embodiments in which adhesive is applied to the pull-tab 104, it operates essentially as a type of tape and may be referred to as an "adhesive tape."

In one embodiment, the pull-tab 104 is a pressure-sensitive label partially secured to the package with suitable securing means known in the art. Such securing means can be permanent or temporary and can include, but is not limited to, permanent adhesive, reusable adhesive, a combination of permanent and reusable adhesive, thermal bond(s), ultrasonic bond(s), spot weld(s), i.e., thermal weld point(s), a stitch or stitches, strip weld(s), tack(s) formed by crimping, and so forth, including any combination thereof. In embodiments in which adhesive(s) are used, adhesive deadener can be added in the area of the pull-tab opening 109 (FIG. 2) to prevent the pull-tab 104 from attaching to the bag 102 in that location. In this way, the pull-tab opening 109 can easily be hooked by the consumer. In other embodiments, this area can alternately contain no securing means. In yet other embodiments, the securing means is patterned, so that the pull-tab 104 is secured in certain locations, such as with patterned adhesive, as is known in the art.

Any suitable type of securing means can be used as long as a portion of the pull-tab 104 remains secured to the bag 102 during the opening process, and preferably thereafter. In most embodiments, the securing means includes both permanent and temporary or reusable securing means, although the invention is not so limited. In the embodiment shown in FIG. 1, permanent securing means can be used in the area of the pull-tab 104 that is located between the perforation lines 125a, 125b and 125c, i.e., in a flap section 130 of the bag 102. Specifically, the flap section or flap 130, shown in dashed lines in FIG. 1, is defined on three sides by the perforation lines 125a, 125b and 125c, but is not actually created until the perforation lines 125a, 125b and 125c are torn. The remaining edge of the flap 130 is defined by a crease (not shown) which is formed when the pull-tab 104 is opened, i.e., when the perforation lines 125a, 125b and 125c have been completely torn. The crease is located generally along an edge 132 of the pull-tab 104 opposite the pull-tab opening 109. In such an embodiment, reusable securing means can be used outside the area of the flap 130 so that the pull-tab 104 can be used again to reseal the bag 102. The permanent and temporary securing means can be applied directly to the bag 102 and/or to the pull-tab 104, depending on the particular application.

The type, amount, location and distribution of the securing means is primarily dependent on the size and configuration of the perforations. Basically, the force required to initially tear the lines of weakness, which in the embodiment shown in FIG. 1 includes perforation line 125c, and may even include a small portion of perforation lines 125a and 125b, needs to be less than the force it would take to remove the pull-tab 104 from the flap 130. In other embodiments, the initially torn line of weakness may include a slit or cut rather than a perforation such as perforation 125c (See 326 in FIG. 3). Once the other lines of weakness begin to tear, e.g., 125a and 125b in FIG. 1, the user typically applies less force to effect tearing and the pull-tab 104 continues to stay adhered to the flap 130. In one embodiment, the perforations have a strength of between about 1600 and 2200 grams of force, depending on bag material, composition and thickness. The strength of the securing means for the pull-tab must be sufficient to overcome the strength of a particular set of perforations. Securing means specifications are also dependent on the size, configuration and location of the pull-tab on the bag, and may further depend on package size and even content type, form (e.g., compressed or uncompressed), amount, size, and so forth.

In resealable embodiments, a sufficient portion of the pull-tab 104 needs to be secured to the bag 102 initially so as to prevent the pull-tab 104 from coming off prematurely. However, if too much of the pull-tab 104 is secured, the consumer will have difficulty accessing the pull-tab opening. In one embodiment, at least about 60% of the pull-tab is secured to the bag 102 initially, and at least about 30% of the pull-tab 104 remains secured to the bag 102 after all the lines of weakness have been torn. The remaining 30% that is no longer secured, i.e., is releasably secured, is available for resealing the bag opening. In other embodiments, up to about 90% is secured initially.

In the securing means described above for FIG. 1, the entire flap 130 remains secure to the bag 102 during the opening process. In other embodiments, less than all of the flap 130 is designed to remain secure. However, enough of the pull-tab 104, i.e., at least about 25 to 50% should remain secured to the bag 102 (i.e., the flap 130 in this embodiment) to ensure that it can assist in separating the perforations when pulled on. Otherwise, the pull-tab 104 may come off prematurely. Conversely, if too much of the pull-tab 104 is permanently secured to the bag 102, the bag may open at locations other than the intended perforations. Additionally, if the pull-tab 104 is used as a carrying handle, it is likely that the perforation lines could tear prematurely simply from the weight of the package itself.

The reusable securing means, such as reusable adhesive, needs to maintain its stickiness or tackiness such that the remaining portions of the pull-tab 104 that are not intended to remain adhered to the bag 102 during opening, i.e., are releasably secured, can continue to be used repeatedly to reseal the bag through application of only a slight pressure by the user. However, it is understood that over time, a greater portion of the pull-tab 104 may become releasably secured, although the adhesive amount and type is designed to ensure that a sufficient area remains permanently secured in order to prevent the pull-tab 104 from being pulled completely off the bag 102. Although less preferable, it is possible for a consumer to tear open the perforations and continue pulling until the pull-tab is completely removed, and then reapply the pull-tab over the opening to reseal. In an exemplary embodiment, the adhesive is a releasable pressure sensitive adhesive available from ATO Findley in Wauwatosa, Wis. and the adhesive deadener is a talc or starch powder added to the adhesive in an amount and distribution sufficient to prevent the adhesive from bleeding through, as is known in the art. In one embodiment, the adhesive-free or deadened area of the pull-tab 104 comprises about 5 to 15%, the resealable section comprises about 35 to 75% and the permanently secured section comprises about 20 to 50%.

The pull-tab opening 109 can be any suitable size that provides sufficient room for a person to be able to hook a hand, finger or fingers, spoon, cane, prosthetic hook, pen or any other object through in order to assist in opening the bag. In one embodiment, the pull-tab opening is large enough for a person to slip one to two average-sized fingers (or the equivalent) through. In another embodiment, the pull-tab opening 109 is large enough for three-fingers or its equivalent to be slipped through. According to industry guidelines, the average index finger width for an adult female and adult male is about 1.9 cm (about 0.75 in) and 2.3 cm (about 0.9 in), respectively. It is estimated that two fingers would be about 3.8 cm (about 1.5 in) and 4.6 cm (about 1.8 in), respectively and three fingers would be about 5.7 cm (about 2.3 in) and about 6.9 cm (about 2.7 in), respectively. However, smaller individuals may have finger widths much smaller, such as about 1.3 cm (about 0.5 in) or even less. In most embodiments, the pull-tab opening 109 is at least about 1.3 cm (about 0.5 in) in width and/or length, but not greater than about 7.6 cm (about three (3) in) in width and/or length.

In a particular embodiment, the opening is a circular opening about 2.5 cm (about one (1) in) in diameter. In yet another embodiment, the pull-tab opening is much larger, i.e., up to about 15 cm (about six (6) in) or more in width and/or length so that it is large enough for a person to slip their entire hand through.

Figure 2:
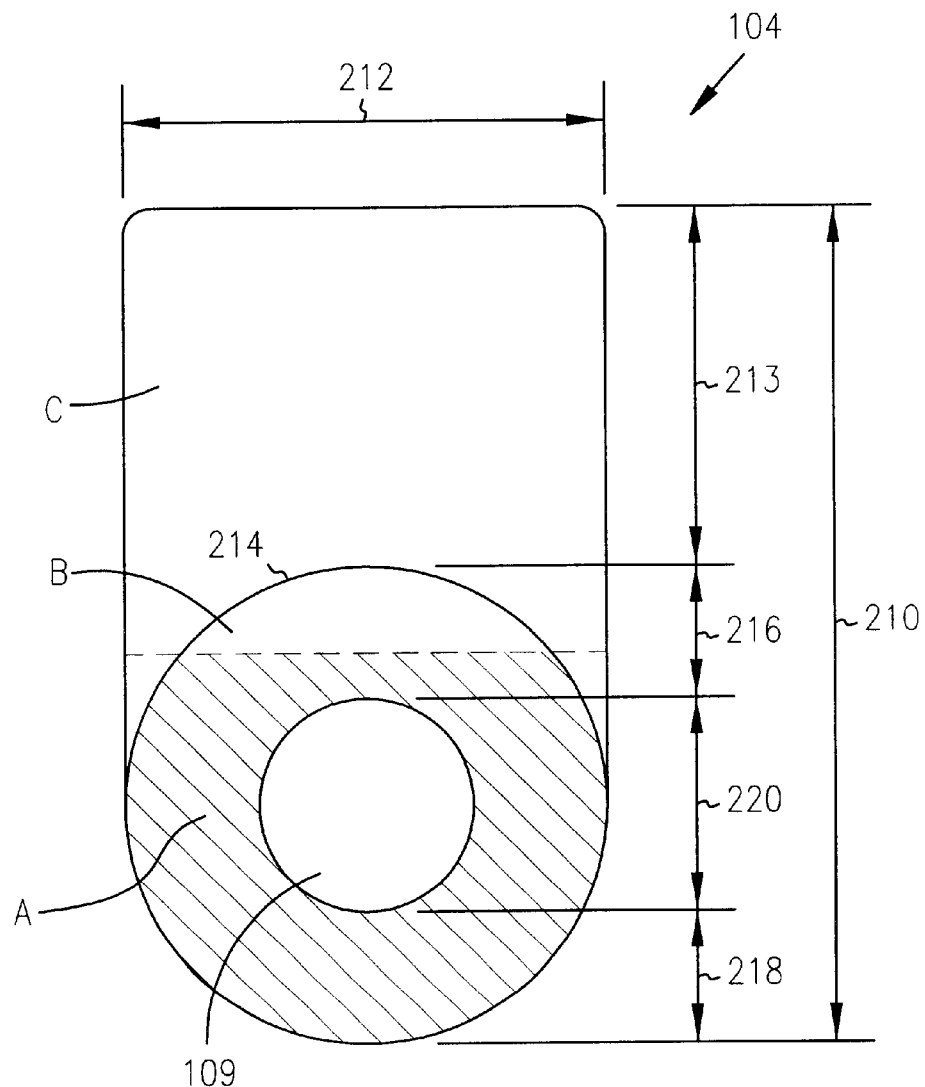
FIG. 2 is a simplified schematic illustration of the reusable pull-tab of FIG. 1 in one embodiment of the present invention.

FIG. 2 provides a close-up view of the pull-tab of FIG. 1. Dimension 210 represents the length of the pull-tab 104, with Dimension 212 representing the width. In this embodiment, the pull-tab 104 has a length about 2.5 times the width, although the invention is not so limited. In an exemplary embodiment, Dimension 210 is about eight (8) cm (about 3.1 in) and Dimension 212 is about five (5) cm (about two (2) in). The pull-tab opening 109 in this embodiment is encircled with a printed ring 214 to aid the consumer in locating the pull-tab opening 109. In one embodiment, the ring 214 is a different color than the rest of the pull-tab 104 for easy identification. For example, the ring 214 can be yellow, while the remaining portion of the pull-tab 104 is clear. Areas "A" and "B" together comprise the ring 214, with Area "C" comprising the remaining portion of the pull-tab 104. The portion of the ring 214 shown in cross-hatching in FIG. 2, i.e., Area "A," contains no securing means, which can include application of a securing means deadener onto previously-applied securing means. Area "A" may be larger or smaller, depending on the particular application. The remaining portion of the ring, Area "B," is permanently secured to Area "C" such as through bonding or the like. Area "C" also contains securing means, which typically includes a combination of permanent and temporary or resealable securing means. For example, the permanent securing means in Area "C" can be a strip weld (FIG. 5) or spot weld (FIG. 8) or any other type of permanent securing means known in the art. Part or all of the remaining portion of Area "C" can contain resealable securing means, such as a resealable pressure-sensitive adhesive.

In this embodiment, Dimension 213 represents the length of Area "C" at the point it contacts the ring 214. Dimensions 216 and 218 represent the width of the ring 214 and Dimension 220 represents the diameter of the pull-tab opening 109. In this embodiment, the width of the ring 214 is about one-half the diameter of the pull-tab opening 109, although the invention is not so limited. In the exemplary embodiment noted above, Dimensions 216 and 218 are each about 1.3 cm (about 0.5 in) and Dimension 220 is about 2.5 cm (about one (1) in), with Dimension 213 about 2.9 cm (about 1.1 in).

The pull-tab 109 does not need to be any particular thickness as long as it can perform the intended function. In one embodiment, the pull-tab is between about three (3) and four (4) mm thick, but not less than about one (1) mm thick, although an absolute minimum thickness is dependent on a particular application. Although the pull-tab can be made in thicknesses greater than four (4) mm, in most instances, there is no significant advantage gained to offset the associated increase in material costs.

Figure 3:
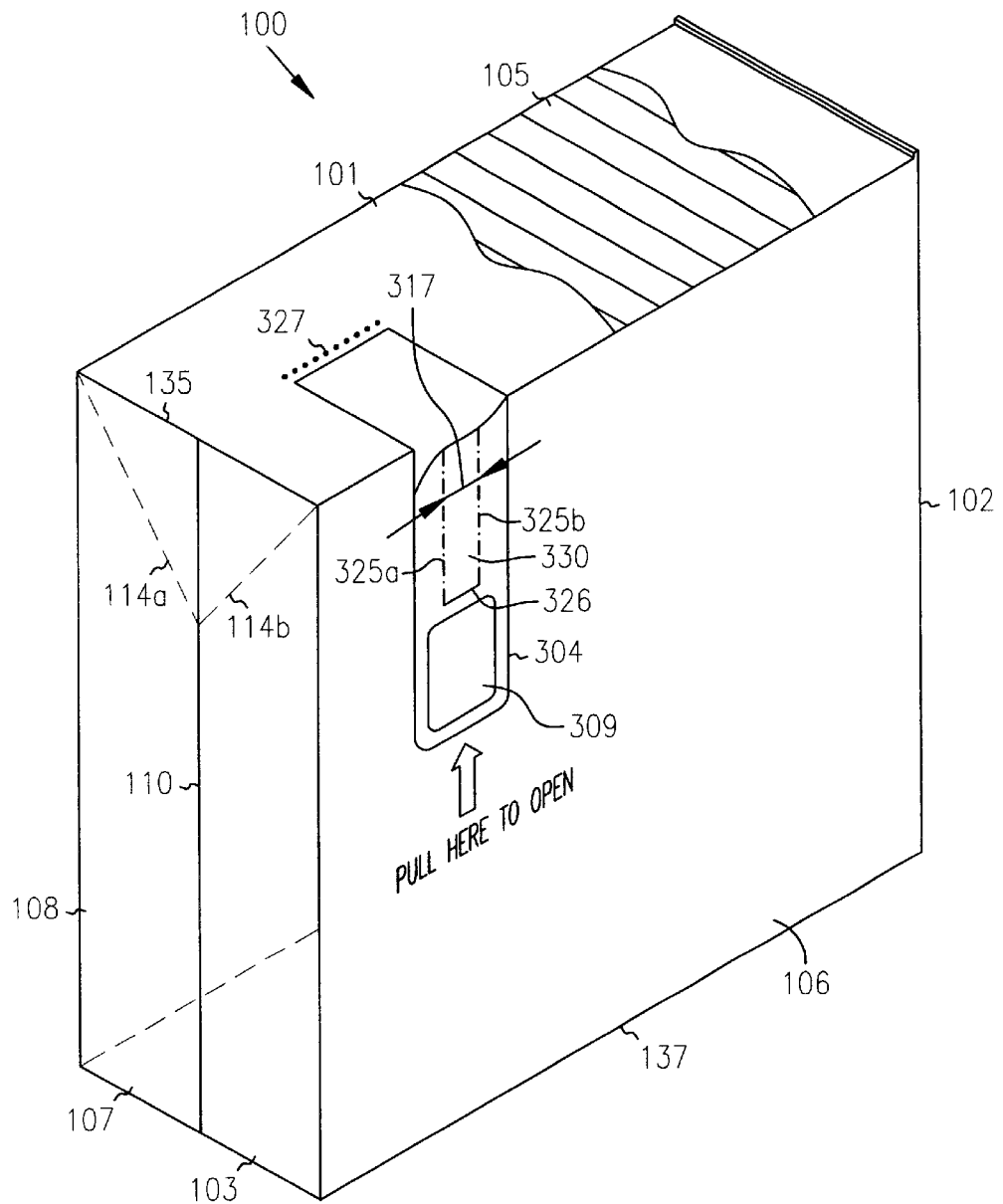
FIG. 3 is a simplified perspective view of a package comprising a bag having perforations and an alternative pull-tab located on top of the perforations in one embodiment of the present invention.

FIG. 3 shows an embodiment of a package 100 having an alternative pull-tab 304 with an alternatively-shaped pull-tab opening 309 proximate to the front panel 106, rather than the top panel 101 as in FIG. 1. Two rows of substantially parallel perforation lines 325a and 325b on the package 100 are concealed beneath the pull-tab 304, although viewable in the cut-away portions shown in FIG. 3. A slit 326 that extends between the perforation lines 325a and 325b at one end can also be seen, at the end nearest the pull-tab opening 309. The perforation lines 325a and 325b and slit 326, are lines of weakness that are created according to methods known in the art and this process will not be discussed in detail herein. Upon being torn, the perforation lines, 325a and 325b, together with the slit 326, form a flap 330. The flap 330 provides the opening through which the articles 105 are accessible. A crease 327, shown in FIG. 3 as dotted lines, eventually develops in the flap once the perforations are fully torn, as noted above in reference to FIG. 1. Again, the crease 327 is not present before the perforations are torn and may be less pronounced or essentially disappear when the pull-tab 304 is resecured to the bag 102 in between uses.

The perforation lines 325a and 325b can extend any suitable length depending on the particular application, including the package size, strength, type of adhesive, and so forth. In most embodiments, the perforation lines 325a and 325b do not extend into the area of the finger-sized grip 309, as this would not provide any additional advantage as an opening means in this location. In the embodiment shown in FIG. 8, the perforation lines 325a and 325b begin about half-way up the front panel 106 and are substantially parallel with the side seam 110. In this embodiment, the perforation lines 325a and 325b continue onto the top panel 101 (substantially parallel with the top edge 135), extending about one-half of the way across the width of the top panel 101. In other embodiments, the perforation lines 325a and 325b can extend anywhere from about one-fourth to about three-fourths of the distance across the width of a top or bottom panel (and/or up or down the length of a front or back panel) or may be confined entirely to one panel (See FIG. 4). In other embodiments, the perforations are oriented differently, are in different configurations other than substantially parallel lines, and/or in different locations on the package, as discussed below.

Distance 317 in FIG. 3 defines the distance between the two perforation lines 325a and 325b, which in this instance also represents the length of the slit 326. Distance 317 can be any suitable distance as long as the perforation lines 325a and 325b can perform their intended function. In most embodiments, the perforation lines 325a and 325b are not so close together as to be difficult to properly manufacture nor so far apart as to lose the ability to function properly. In one embodiment, Distance 317 is about 75 to 90% of the width of the pull-tab 304. Depending on the size of the pull-tab 304, Distance 317 can be anywhere from about 1.2 cm (about 0.5 in) to about five (5) cm (about two (2) in) apart, with the pull-tab 304 made correspondingly larger or smaller as needed or desired. In one embodiment, Distance 317 is about five (5) cm and the width of the pull-tab 304 is about six (6) cm.

Other perforation configurations are possible. For example, in some embodiments, the two substantially parallel lines of perforations may straddle a single side seam, i.e., with both parallel to the side seam, but with one line located on a front or back panel and another line located on a side panel, as long as the resulting opening that is created when the perforations are torn provides adequate access to the contents within. The two substantially parallel lines of perforations may also be located on non-adjacent panels. For example, in one embodiment, two substantially parallel lines of perforations are divided between the front and back panels, with a third perforation line or slit joining these perforations at one end, thus creating an opening greater than the width of the side panel. In such embodiments, the pull-tab 104 can also be larger to accommodate the wider opening or can be located such that not all the perforations are concealed. (See FIGS. 8–11 for examples of embodiments having exposed perforation lines).

Figure 4:
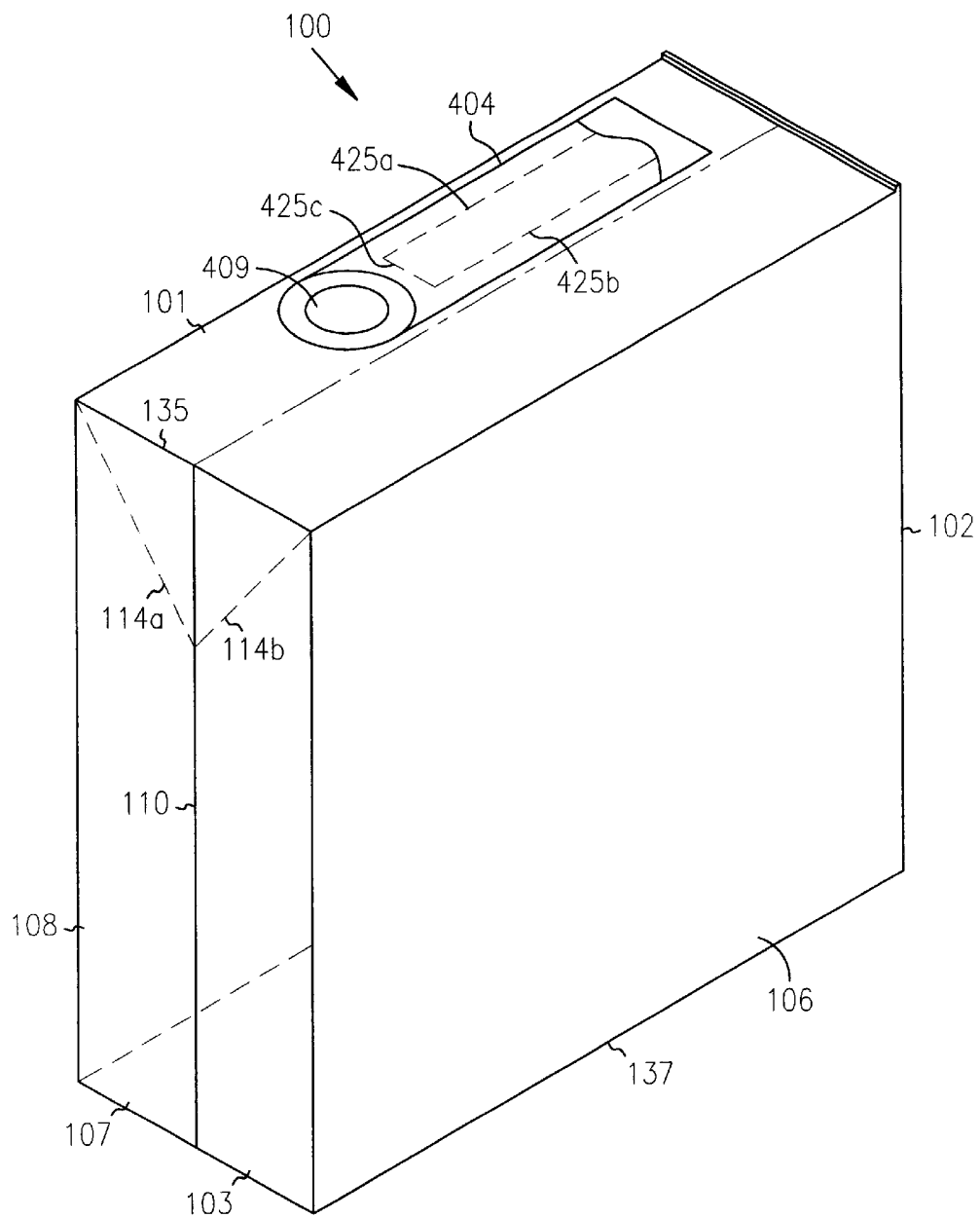
FIG. 4 is a simplified perspective view of a package comprising a bag having perforations and another alternative pull-tab oriented on top of the perforations in one embodiment of the present invention.

FIG. 4 shows an embodiment of a package 100 having an alternative pull-tab 404 with an alternatively-shaped pull-tab opening 409, the pull-tab oriented substantially horizontally on the top panel 101 of the bag 102. In this embodiment, slit 326 shown in FIG. 3, is replaced by perforation lines 425c, which essentially perform the same function, although the slit is believed to provide greater confidence that the lines of weakness will require less force to open. Again, the pull-tab 404 can be any suitable size and secured to any suitable portion of the bag 102. In this embodiment, the pull-tab 404 and lines of weakness (perforations 425a, 425b and 425c) are all confined to the top panel 101. The pull-tab opening 409 in this embodiment is shown as an oval-shape, although any suitable size and shape can be used to create a pull-tab opening, as noted above.

Figure 5:
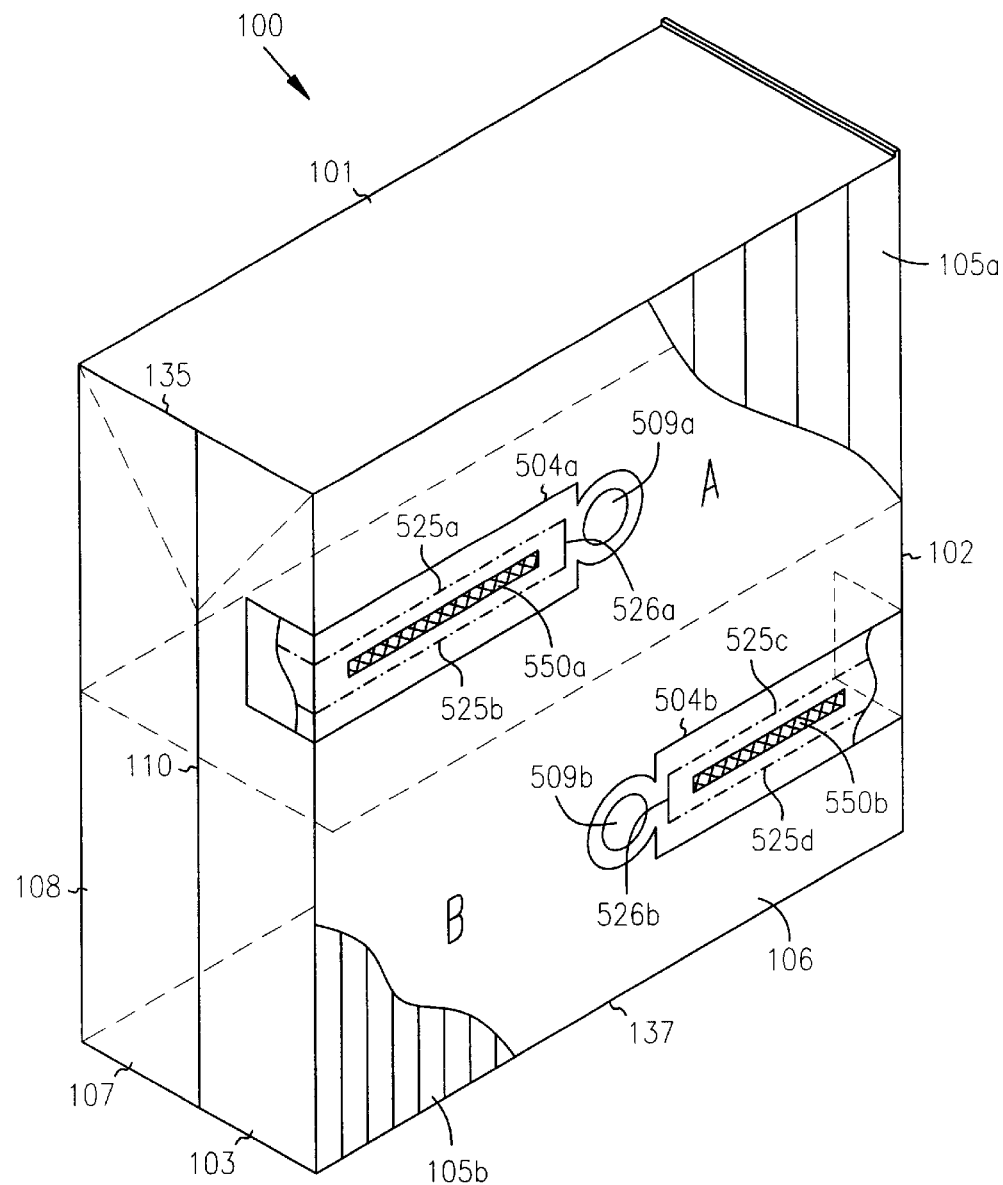
FIG. 5 is a simplified perspective view of a package comprising a bag having two sets of perforations and two alternative pull-tabs located on top of the two sets of perforations in one embodiment of the present invention.

FIG. 5 shows an embodiment of a package 100 have two alternative pull-tabs 504a and 504b, each having a pull-tab opening, 509a and 509b, respectively. A portion of each pull-tab 504a and 504b is permanently secured to the bag 102 with strip welds 550a and 550b, respectively, although any suitable securing means can be used. In this embodiment, both pull-tabs, 504a and 504b, are oriented substantially horizontally along the package, although the invention is not so limited. Multiple pull-tabs can be oriented in any suitable direction and further do not necessarily have to be oriented in the same direction, nor do each individual pull-tab need to be oriented in just one direction (See, for example, FIGS. 1 and 3). By providing more than one pull-tab and perforation combination, as in this embodiment, it is possible to provide access to separate areas of the bag 102, such as when two different types of products are contained within.

In this embodiment, pull-tab 504a provides access to Area "A," which contains larger-sized articles 105a. Similarly, pull-tab 504b provides access to Area "B," which contains smaller-sized articles 105b. Again, each pull-tab 504a has an associated set of perforations, with pull-tab 504a having two substantially parallel perforation lines 525a and 525b, connected by a slit 526a located at the same end as the pull-tab opening 509a (although a third set of perforations can alternately be used as described above in FIG. 1). Similarly, pull-tab 504b conceals two substantially parallel perforation lines 525c and 525d, connected by a slit 526b (or third perforation line) located at the same end as the pull-tab opening 509b. It should be apparent that such multi-pull-tab embodiments are not limited to embodiments having two substantially parallel lines of perforations together with a slit or third perforation line, and can be used together with any type of perforations, including, but not limited to, those described in FIGS. 8–11 below.

Figure 6:
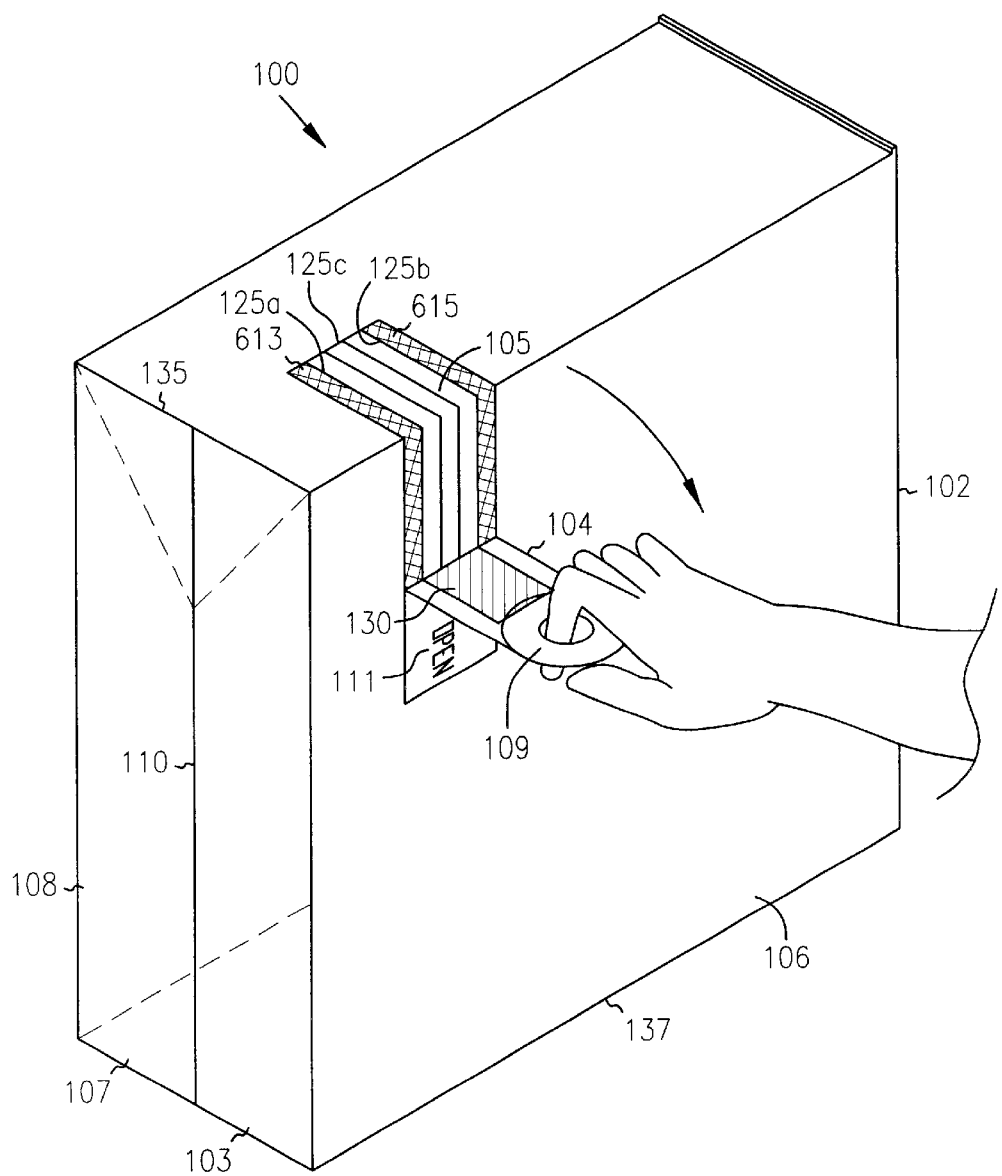
FIG. 6 is a simplified perspective view of the package in FIG. 1 being opened with the reusable pull-tab in one embodiment of the present invention.

FIG. 6 shows the package 100 being opened using the pull-tab 104 of FIG. 1, in conjunction with perforation lines 125a, 125b and 125c, to expose articles 105 within. The result is a convenient, yet restricted package opening, i.e., flap 130, as described above. As FIG. 6 shows, adhesive areas 613 and 615 are created adjacent to the perforation lines, 125a and 125b, respectively, when the pull-tab 104 is separated from the bag. Additionally a crease is also created upon opening, as discussed above.

Use of the pull-tab opening of the present invention, such as the pull-tab opening 109 shown in FIG. 6, for accessing the perforations such as 125a, 125b and 125c, simplifies the opening process, particularly for those with poor manual dexterity, such as the elderly. There is now no need to use a gripping force when attempting to tear open perforations, or poke at the perforations, such as with a finger or knife. By simply pulling on the pull-tab opening 109 in a direction generally downwardly (or upwardly, depending on the orientation of the pull-tab) and away from the perforations, as shown in FIG. 6, the compressive forces within the packaged articles are partially released to facilitate removal of the first articles 105 from the bag 102. Such articles 105 are generally stacked inside the bag 102 as shown in FIGS. 1 and 6. The articles 105 may further be folded, unfolded, and/or individually wrapped. These articles 105 include disposable absorbent articles such as, infant diapers, feminine care products and adult incontinence garments, and so forth. By further providing the pull-tab opening 109 in the form of an easily identifiable ring or hole, a consumer can now easily open the package 100 of the present invention under most any conditions, including while traveling, to access the articles 105 contained within. This is an advantage over prior art packages which provide only a small tab with no opening that can be difficult to see, identify and hold on to, particularly for the elderly and/or those with poor vision and/or manual dexterity. In some embodiments, a portion or all of the ring glows in the dark to provide further assistance in dimly lit or dark areas.

Figure 7:
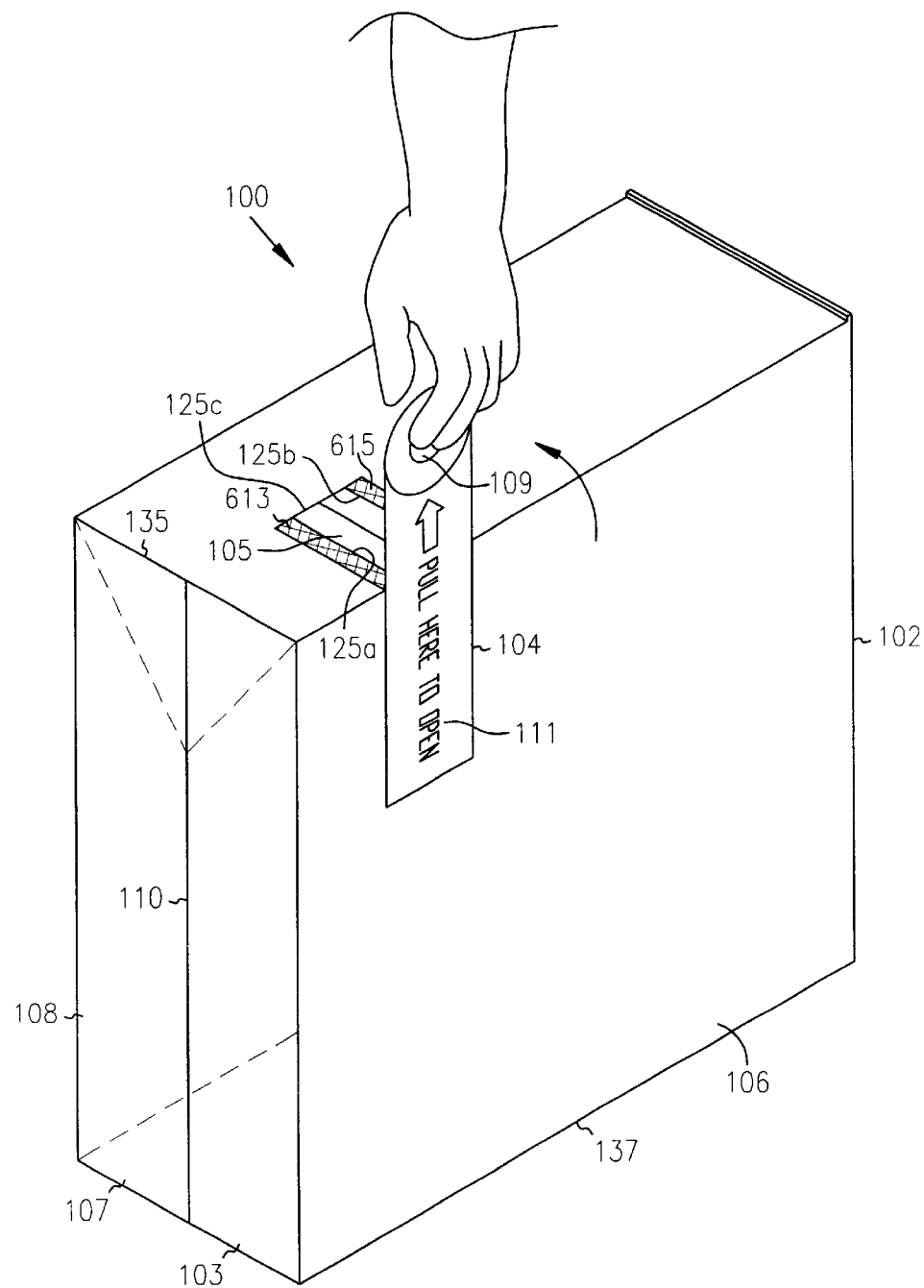
FIG. 7 is a simplified perspective view of the package in FIG. 1 being resealed with the reusable pull-tab in one embodiment of the present invention.

FIG. 7 shows the package 100 being resealed by the user with the pull-tab 104. Such a step is relatively simple, requiring a person to exert only a minimal pressure on the pull-tab 104 in the area of the pull-tab opening 109 in order to secure the pull-tab 104 to the bag 102 again with the adhesive. The adhesive areas 613 and 615 are reusable, preferably remaining tacky or sticky for the life of the package, i.e., for at least a number of openings and closings equal to the number of articles contained within. In some embodiments, this may be just one or two times. In other embodiments, this can be 20 times, up to about 50 or more times.

Figure 8:
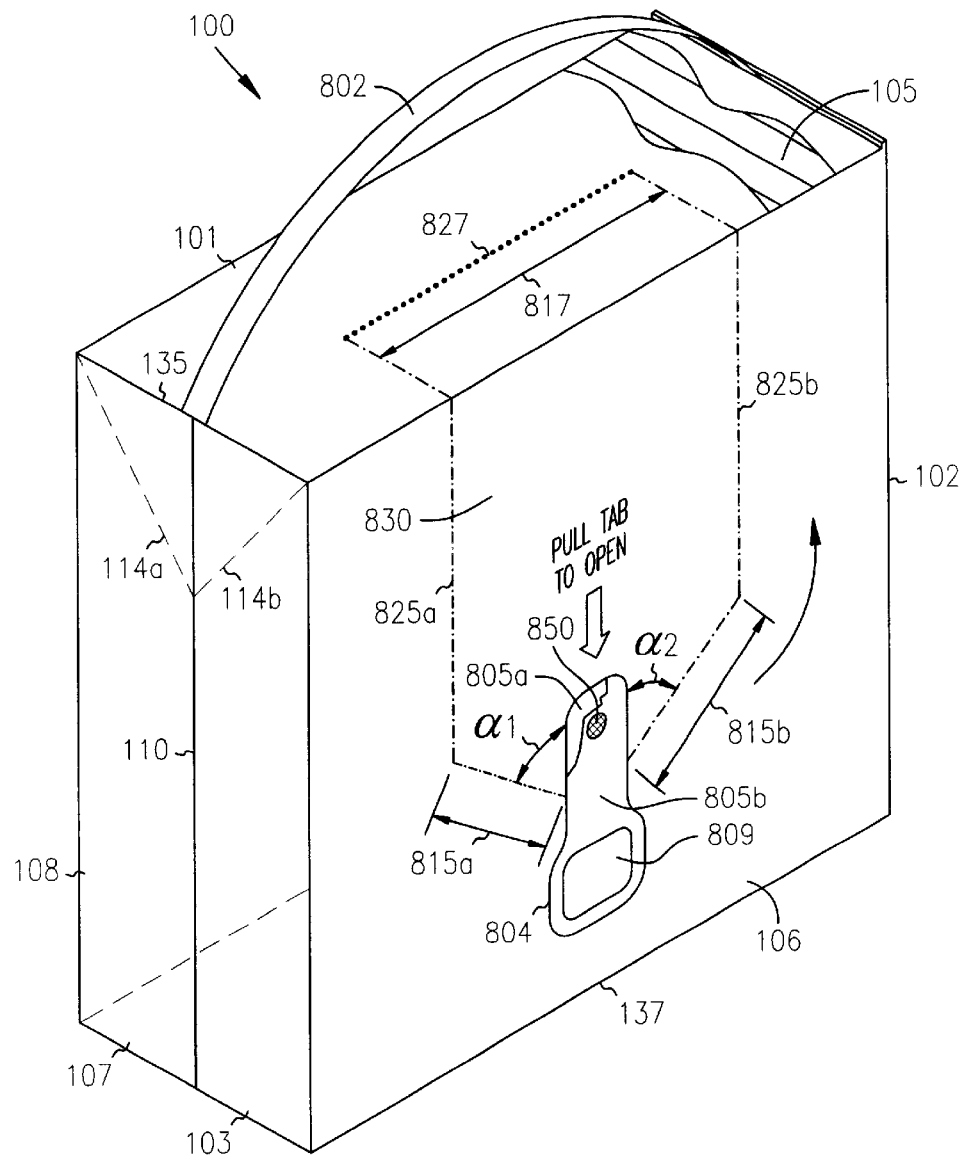
FIG. 8 is a simplified perspective view of a package comprising a bag having a handle, perforations, and an alternative pull-tab in one embodiment of the present invention.

Many other configurations of the pull-tab opener and perforations are possible. FIGS. 8–11 illustrate only a few of the additional forms the present invention can take. For example, FIG. 8 shows a package 100 having a handle 802 and an alternative substantially vertical laminated pull-tab 804 (having layers 805a and 805b) associated with and concealing only a small portion of the alternative perforation lines 825a and 825b. In the embodiment shown, the pull-tab 804 is secured to the bag 102 with a spot weld 850, although the invention is not so limited. Again, any suitable type of securing means known in the art can be used. It should be recognized that the non-parallel perforation lines shown in FIGS. 8–11 can be used with any type of flexible package, although use of this type of design may be particularly useful with larger packages. Similarly, the substantially parallel perforation lines discussed herein can also be used with any type of package, including packages having handles.

Figure 10:
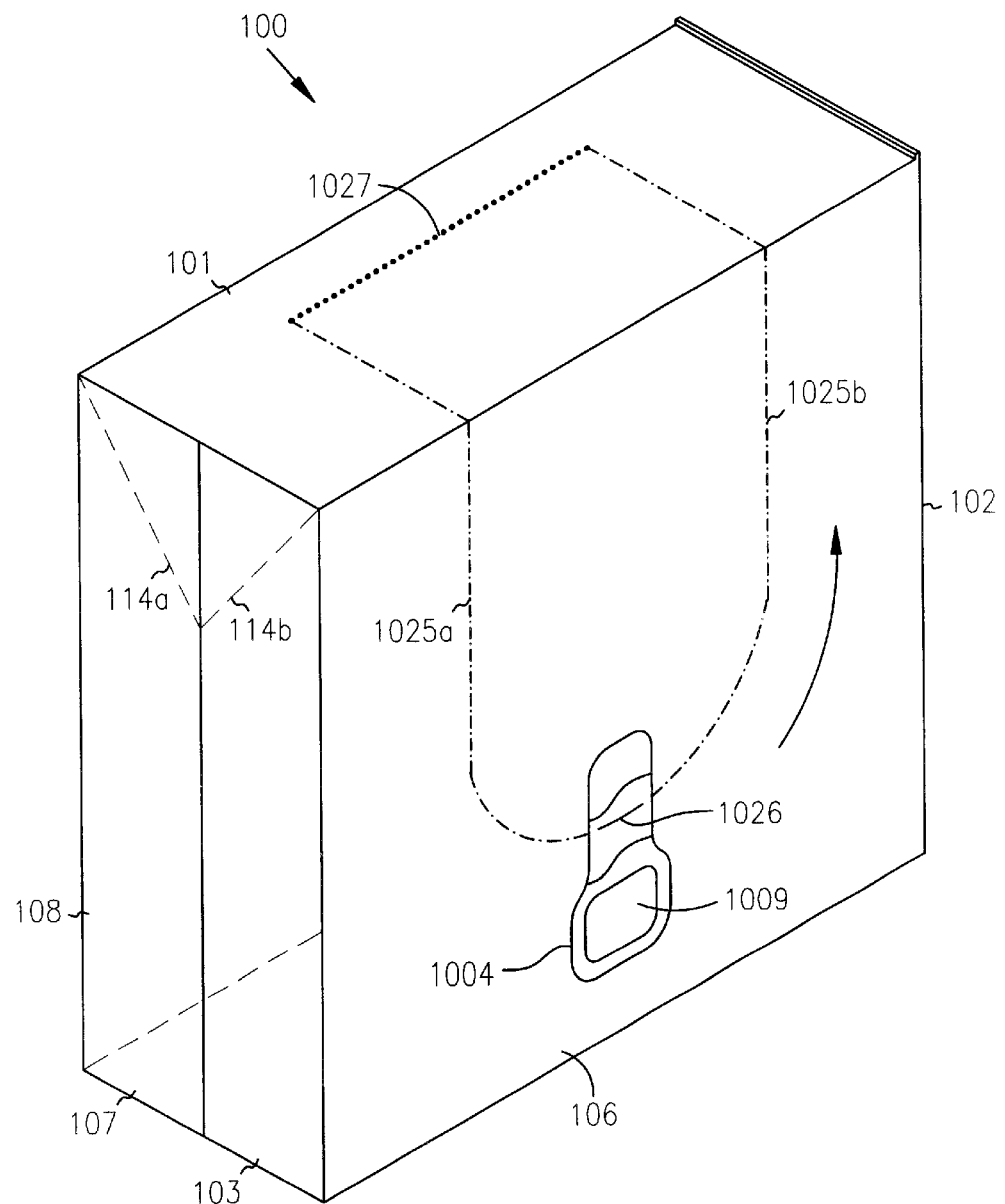
FIG. 10 is a simplified perspective view of a package comprising a bag having perforations and an alternative pull-tab located at a perforation junction in one embodiment of the present invention.
Figure 11:
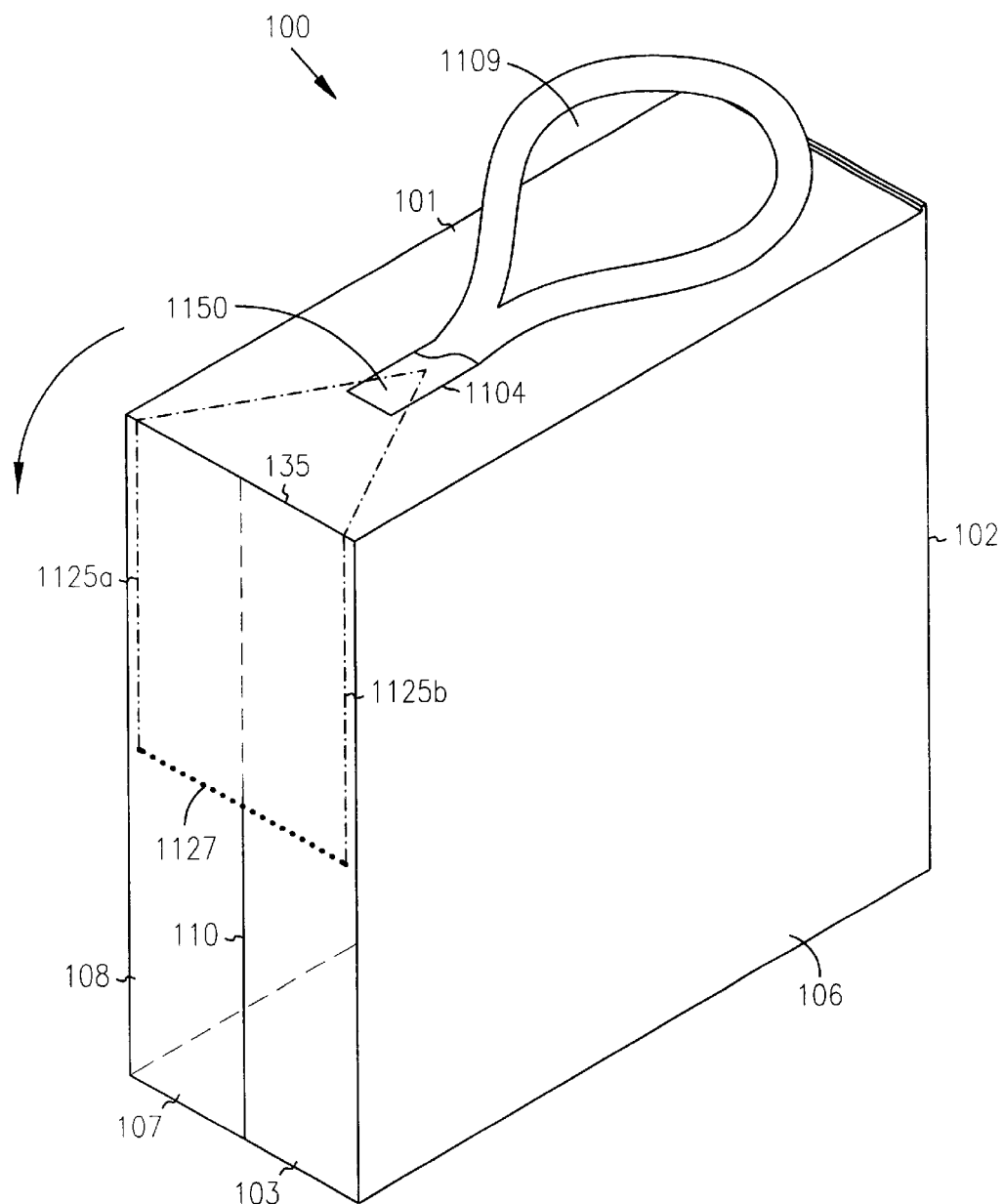
FIG. 11 is a simplified perspective view of a package comprising a bag having perforations and another alternative pull-tab located at an alternative perforation junction in one embodiment of the present invention.

In one embodiment, the perforation lines 825a and 825b can be brought to a joining point or perforation junction (See FIG. 11). In an alternative embodiment, the pull-tab 804 may alternately conceal only a few of the perforations or even none. In such embodiments, a small cut or slit is located beneath the pull-tab 804 (see, for example, FIG. 10) to connect the two perforation lines. In such embodiments, the perforations are non-parallel non-touching, i.e., non-intersecting lines having a distance of minimum separation, with the reusable pull-tab located in the area of minimum separation, i.e., concealing this distance. In yet other embodiments, such as with curved perforation lines, it may be that there is essentially just one perforation line that continues underneath the pull-tab, i.e., a U-shaped perforation line, with the pull-tab located in an area of maximum perforation bend.

In the embodiment shown in FIG. 8, the pull-tab 804 is oriented with the pull-tab opening 809 at its lower end such that the pull-tab 804 is pulled upwardly to cause the perforation lines 825a and 825b to tear. Upon being torn, the perforation lines, 825a and 825b, together with the slit or connecting perforation line (not shown beneath the pull-tab 804) define a flap 830 as described above and shown in FIG. 8. The flap 830 further develops a crease line 827 once it is opened sufficiently, i.e., pulled away from the bag 102. As in the other embodiments described herein, the flap 830 provides the opening through which the articles 105 are accessible. In FIG. 8, the perforations are primarily located "above" the pull-tab 104. In other embodiments, the pull-tab opening is located at the upper end of the pull-tab 804, such that it is pulled in a downwardly direction to cause the perforations to tear. In such embodiments, the perforations are also oriented differently, with the bulk of the perforation lines located "below" the pull-tab 804. In yet other embodiments, the perforation lines are located both above and below the pull-tab 104, such that the pull-tab 104 is pulled sideways to create the bag opening or flap.

The perforation lines 825a and 825b can be any suitable length depending on the particular application, including the package size, strength, type and thickness of material, type of adhesive, and so forth. In most embodiments, the perforation lines 825a and 825b do not extend into the area of the finger-sized grip 809, as this would not provide any additional advantage as an opening means in this location. In the embodiment shown in FIG. 8, the perforation lines 825a and 825b begin about one-third of the way up from the bottom edge 137 of the front panel 106 and extend upwardly and outwardly in opposite directions at any suitable angle for any suitable distance, i.e., diagonal lines. In one embodiment, the angled portions, Distances "815a" and "815b", respectively, comprise about 20–35% of the total length of the perforations 825a and 825b, respectively, and have angles $\alpha_1$ and $\alpha_2$ less than 90 degrees. If angles $\alpha_1$ and $\alpha_2$ are too large, such that angles $\alpha_1$ and $\alpha_2$ are nearly right angles, it may be difficult to initiate tears in the remaining perforations. The remaining portion of the perforation lines 825a continue up along the front panel and onto the top panel 101 substantially parallel in a manner as described above in reference to FIG. 3. In alternative embodiments, the diagonal portion of the perforations can comprise the complete set of perforations. In such embodiments, the diagonal perforation lines would likely extend further than shown in FIG. 8, at a different angle, and for a greater distance than the diagonal portion (Distances 815a and 815b) shown in FIG. 8.

Distance 817 in FIG. 8 defines the maximum distance between the two perforation lines 825a and 825b, which in this instance also represents the length of the crease 827. Distance 817 can be any suitable distance as long as the perforation lines 825a and 825b can perform their intended function as discussed above. In one embodiment, Distance 817 is about 40 to 60% of the total width of the front or back panels, 106 or 108, respectively. Depending on the size of the bag 102, Distance 817 can be anywhere from about three (3) cm (about 1.2 in) to about 25 cm (about 10 in) apart. In the specific embodiment described above in which the bag 102 is about 24×30×12 cm in height, length and thickness, respectively, Distance 817 is about 15 cm.

Figure 9:
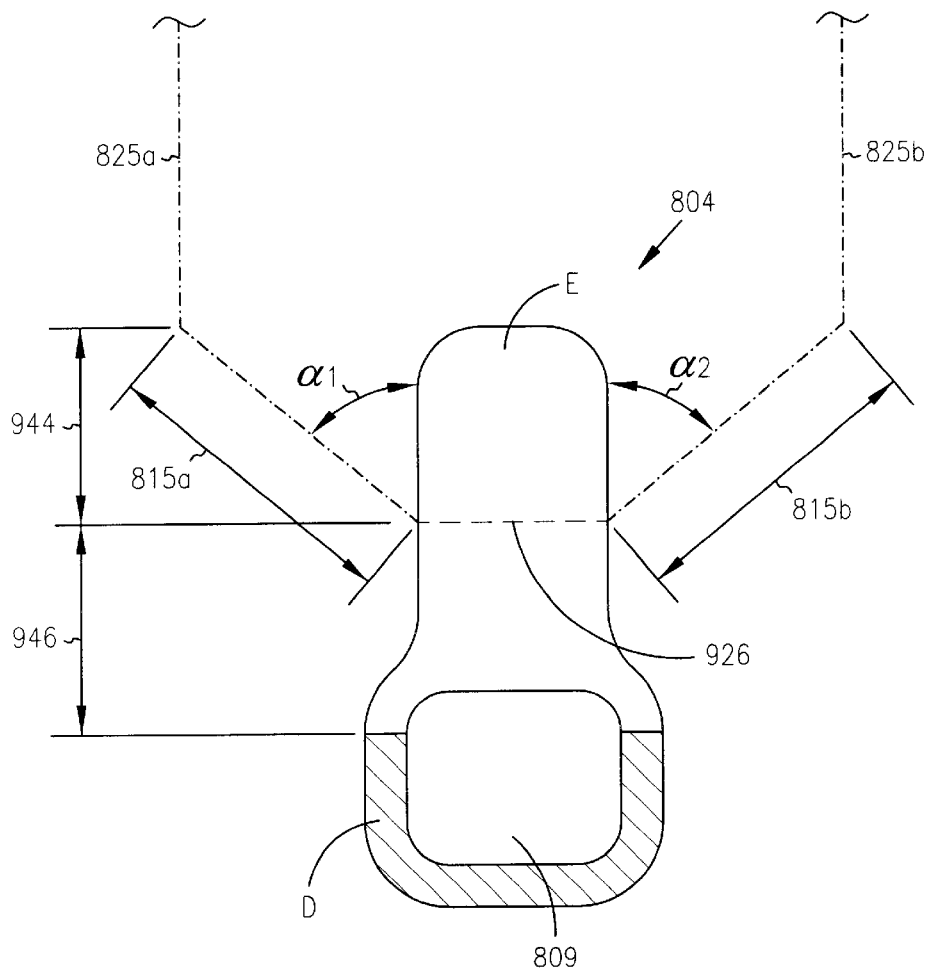
FIG. 9 is a simplified schematic illustration of the alternative pull-tab and a portion of the perforation configuration of FIG. 8 in one embodiment of the present invention.

FIG. 9 provides a close-up view of the pull-tab 804 of FIG. 8. As in FIG. 2, certain areas have securing means and other areas do not, whether it be because no securing means is present or due to application of a securing means deadener onto an area already having securing means. In this embodiment, Area "D" contains no securing means while Area "E" contains securing means. In one embodiment, Area "E" contains permanent securing means as described above.

In another embodiment, only a portion of Area "E" contains permanent securing means and the remainder is reusable securing means or has no securing means. However, it is important that a sufficient portion of the pull-tab 104 remains secured to the package permanently during use, i.e., that the strength of the pull-tab permanent securing means is greater than that required to separate the lines of weakness. In one embodiment, Area "E" or a portion thereof, is heat-sealed in place. In other embodiments, Area "D" may alternately contain temporary or reusable securing means.

FIG. 9 further shows a slit 926, as described above, used to help initiate a tear in the perforation lines 925a and 925b when a user lifts the pull-tab 904. In most embodiments, the slit 926 stops before reaching the edges of the pull-tab 904, although in the embodiment shown in FIG. 9, the slit 926 extends to the edges of the pull-tab 904. In some embodiments, the slit 926 may even extend beyond the edges of the pull-tab 904, but generally not more than about 0.6 cm (0.25 in). If the slit 926 extends too far beyond the edges of the pull-tab 904, however, a tear could develop, thus allowing contaminants to enter the bag. Such a tear or hole could also affect the proper performance of the perforations. In one embodiment, the slit 926 stops about 0.25 cm (0.1 in) to about one (1) cm (0.39 in) from the edges of the pull-tab 804.

FIG. 9 also shows Dimensions 944 and 946. Dimension 944 extends from one end of the pull-tab 804 to the slit 926. Dimension 946 extends from the slit 926 to the beginning of Area "A." In this embodiment, Dimensions 944 and 946 are about equal, although the invention is not so limited. Dimension 944 only need be of sufficient length to continue to adhere to a bag during the opening process. Similarly, Dimension 946 only need be of sufficient length to continue to adhere to the bag during storage, i.e., serve as a closing flap for the bag.

FIG. 10 shows an embodiment of a package 100 having another alternative pull-tab 1004 and another alternative set of perforation lines 1025a and 1025b. Additionally, a slit 1026 is shown in the cut-away portion of the pull-tab 1004. Upon opening, an alternative crease 1027 is formed at the upper edge of the pull-tab 1004. In a different embodiment, the perforations do not stop in the area of the pull-tab 1004 and essentially continue in one line, forming a U-shape. In yet other embodiments, the perforations are curved in any suitable manner. In these embodiments, the perforations typically have an area of "maximum" bend, and the pull-tab is located in this area.

FIG. 11 shows another alternative embodiment in which the alternatively-designed perforations 1125a and 1125b both extend substantially vertically along the side sections 103 and 107, substantially parallel to the side seam 110. In this embodiment, the perforation lines 1125a and 1125b continue along the top panel 101 at a diagonal until they meet at a perforation junction 1150 as shown in the cutaway portion of the pull-tab 1104, although the invention is not so limited. In one embodiment, the perforation lines 1125a and 1125b extend about one-quarter to one-half of the way down the side sections 103 and 107. In other embodiments, the perforation configuration shown in FIG. 11 can additionally or alternately be located on the front panel 106 or back panel 108. This configuration of perforations can also be reversed such that more of a spout is formed. Such a configuration can again be located anywhere on the package 100 and can be confined to only one panel, if desired. FIG. 11 further shows an alternative pull-tab opening 1109, which is essentially a full-sized hand grip, but again, is not intended to be used as a carrying handle.

As noted above, the pull-tab does not necessarily need to be made from the same type or strength of material as the bag, as it may not need to have a tensile strength as high as the tensile strength of the bag. Use of a thinner material for the pull-tab in these instances can help to keep seal temperatures lower and is also more economical. In other instances, it is important to consider the nature of the articles being packaged. For example, with compressed packaging, the pull-tab, particularly at the point of attachment with the bag, needs to be able to withstand the existing compression forces, and may require a higher tensile strength than the bag and/or particularly strong securing means. Additionally, the perforations are necessarily stronger with compressed packaging as compared with uncompressed packaging. As a result, the pull-tab securing means needs to be strong enough to overcome the greater force required to tear open the perforations with this type of packaging.

In one embodiment, pull-tabs are made from a roll of plastic coated with adhesive and detachably secured to a releasable material, such as silicon-coated release paper known in the industry. The plastic material is then printed with any needed markings, such as the ring and/or words described above and die cut to the desired shape. The pull-tabs can further be reinforced pull-tabs, texturized pull-tabs, glow-in-the dark pull-tabs, and so forth.

The bag described herein can be produced by any suitable means known in the art. For example, the joining of the front and back panels can be accomplished by various conventional techniques, such as adhesive bonding, thermal bonding, ultrasonic bonding, welding, and so forth. In another embodiment, the panels are connected with mechanical fastening systems, such as sewing, stapling, riveting, and so forth.

In one embodiment, the bags are also formed from a continuous roll of material having a pre-formed gusset and perforations. At the appropriate point during the process the pre-formed and pre-printed pull-tabs, still in roll-form, are blown onto the bag film, such as with the use of an automatic applicator timed to match the speed of the bag formation. Sealing of the two panels at the side seam, such as with heat and compression, causes the bags to break apart. In another embodiment, the bags are made individually.

In all instances, it is important that adequate welds or seals are produced at all locations. A combination of time, temperature, pressure, seal area and/or bag film materials may be used to accomplish an adequate seal as is known in the art. Seals are tested using standard industry methods, although seal strength requirements vary by individual specifications, depending on consumer, product and equipment needs. Strength tests are performed not only on the bag and handle seal, but also on both side seams (including gusset area seals), as well as the perforations by methods known in the art. In some instances, an AMTS Sintech 1" made by MTS Systems Corporation in Minneapolis, Minn. is used to test seal and perforation strength.

The adhesive-backed pull-tab of the present invention is designed to be hooked by any suitable means that allows a user to then pull on the pull-tab with sufficient, albeit minimal force, in the appropriate direction to cause the perforations on the bag to tear, creating an opening through which the contents within are exposed and accessible. This design allows a person to utilize a larger muscle group as compared to the muscles needed to produce a pinch force. As a result, the pull-tab of the present invention provides ease of opening to those with reduced hand strength, whether through disability, age or illness. After the package is open, the consumer may remove one or more products. After the product(s) is removed, the consumer can easily re-secure the pull-tab or strip to the bag by simply pressing on the pull-tab, thus discouraging or preventing products from falling out.

The pull-tabs of the present invention can be used on any size package, including trial-sized flexible packages that contain only one product to very large packages. Perforations designed to be used in combination with the pull-tab are not limited to any one configuration and can be aligned in any manner in relation to the pull-tab that allows for ease of opening in any number of combinations. In most embodiments, the pull-tab covers two substantially parallel perforations or is otherwise located at a perforation junction, narrowest portion of a curved perforation line or at a point of minimum distance between two separate perforation lines.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A package comprising:
   a bag having lines of weakness that include two substantially parallel lines of perforations and a slit or third line of perforations located substantially perpendicular to and in between the two substantially parallel lines of perforations at one end; and
   a reusable pull-tab opener secured to the bag in a location to cover at least the two substantially parallel lines of perforations, the reusable pull-tab opener having a pull-tab opening integral therewith, further wherein the package is comprised of six panels arranged in a rectangular configuration and the two substantially parallel lines of perforations extend across a portion of two adjacent panels.

2. The package of claim 1 wherein the pull-tab opening is a finger-sized opening into which one to three fingers or an object can be inserted, the object having a maximum diameter not greater than about eight (8) cm.

3. The package of claim 1 wherein the reusable pull-tab opener is secured to the bag with reusable securing means or a combination of reusable and permanent securing means.

4. The package of claim 3 wherein the reusable securing means is a reusable adhesive.

5. The package of claim 4, wherein the reusable adhesive is a pressure-sensitive reusable adhesive.

6. The package of claim 3 wherein the permanent securing means has a strength greater than the tear force required to separate the lines of weakness.

7. The package of claim 6 wherein the permanent securing means is selected from the group consisting of permanent adhesive, thermal bonds, ultrasonic bonds, spot welds, stiches, strip welds, tacks and any combination thereof.

8. The package of claim 3, wherein at least some of a remaining portion of the reusable pull-tab opener has no effective securing means.

9. The package of claim 8 wherein the remaining portion having no effective securing means has adhesive deadener covering a portion of the securing means.

10. The package of claim 1 further comprising articles contained within the bag, wherein the articles can be of different types and sizes.

11. The package of claim 10, wherein the articles are personal care products selected from the group consisting of infant diapers, feminine care products and adult incontinence garments.

12. The package of claim 11, wherein the articles are compressed.

13. The package of claim 10, wherein the articles include food products and pet care products.

14. The package of claim 1 wherein the bag and pull-tab are made from a polymeric plastic film, paper or a paper composite.

15. The package of claim 14, wherein the film is selected from the group consisting of low density polyethylene, low density polyethylene/linear low density polyethylene, low density polyethylene/medium density polyethylene, low density polyethylene/high density polyethylene, a polyethylene/polypropylene combination, and any combination thereof.

16. The package of claim 14, wherein the pull-tab opener further has added polyester or polypropylene to minimize stretching during use.

17. The package of claim 14, wherein the pull-tab opener is laminated.

18. The package of claim 1 further comprising articles contained within the bag, wherein the articles are of the same type and size.

19. The package of claim 1 further comprising articles contained within the bag, wherein the articles are of the same type and different sizes.

20. The package of claim 1 further comprising a second reusable pull-tab opener secured to the bag in a location to cover additional lines of weakness, wherein each reusable pull-tab opener provides access to a different type or size of article.

* * * * *